United States Patent
Kumaki et al.

(10) Patent No.: US 11,667,083 B2
(45) Date of Patent: Jun. 6, 2023

(54) USE OF MIXTURES OF POLYVINYL ALCOHOL WITH LESS POLAR POLYMERS AS SUPPORT STRUCTURE IN 3D PRINTING PROCESS

(71) Applicant: KURARAY CO., LTD., Kurashiki (JP)

(72) Inventors: Yousuke Kumaki, Troisdorf (DE); Moritz Baier, Hofheim (DE); Herbert Briers Keable, Liebistorf (CH)

(73) Assignee: KURARAY CO., LTD., Kurashiki (JP)

(*) Notice: Subject to any disclaimer, the term of this patent is extended or adjusted under 35 U.S.C. 154(b) by 866 days.

(21) Appl. No.: 16/342,379

(22) PCT Filed: Oct. 16, 2017

(86) PCT No.: PCT/EP2017/076382
§ 371 (c)(1),
(2) Date: Apr. 16, 2019

(87) PCT Pub. No.: WO2018/073191
PCT Pub. Date: Apr. 26, 2018

(65) Prior Publication Data
US 2020/0055257 A1 Feb. 20, 2020

(30) Foreign Application Priority Data

Oct. 18, 2016 (DE) .................. 10 2016 220 435.1

(51) Int. Cl.
| | |
|---|---|
| *B29C 64/40* | (2017.01) |
| *B33Y 40/00* | (2020.01) |
| *B33Y 70/00* | (2020.01) |
| *B29C 64/314* | (2017.01) |
| *B29C 64/118* | (2017.01) |
| *C09D 11/104* | (2014.01) |
| *C09D 11/106* | (2014.01) |
| *C09D 11/54* | (2014.01) |
| *B29K 29/00* | (2006.01) |
| *B29K 101/12* | (2006.01) |
| *B33Y 10/00* | (2015.01) |

(52) U.S. Cl.
CPC ............ *B29C 64/40* (2017.08); *B29C 64/118* (2017.08); *B29C 64/314* (2017.08); *B33Y 10/00* (2014.12); *B33Y 40/00* (2014.12); *B33Y 70/00* (2014.12); *C09D 11/104* (2013.01); *C09D 11/106* (2013.01); *C09D 11/54* (2013.01); *B29K 2029/04* (2013.01); *B29K 2101/12* (2013.01)

(58) Field of Classification Search
CPC ..... B29C 64/40; B29C 64/118; C09D 11/104; C09D 11/54; B29K 2029/04
See application file for complete search history.

(56) References Cited

U.S. PATENT DOCUMENTS

| | | |
|---|---|---|
| 8,404,171 B2 | 3/2013 | Heenan |
| 2016/0068671 A1 | 3/2016 | Yamabe et al. |
| 2016/0068678 A1 | 3/2016 | Luo et al. |
| 2016/0194492 A1 | 7/2016 | Smith, Jr. et al. |
| 2017/0232684 A1 | 8/2017 | Yoshimura et al. |
| 2019/0211200 A1* | 7/2019 | Sakai ...................... C08L 53/02 |

FOREIGN PATENT DOCUMENTS

| | | |
|---|---|---|
| CN | 104448641 A | 3/2015 |
| CN | 105400108 A | 3/2016 |
| CN | 105924882 A | 9/2016 |
| CN | 105992688 A | 10/2016 |
| CN | 107189297 A | 9/2017 |
| JP | 2016-172416 A | 9/2016 |
| WO | WO 2015/012862 A1 | 1/2015 |
| WO | WO 2015/108768 A1 | 7/2015 |

OTHER PUBLICATIONS

International Search Report dated Feb. 16, 2018 in PCT/EP2017/076382, 3 pages.
International Preliminary Report on Patentability and Written Opinion dated May 2, 2019 in PCT/EP2017/076382, 6 pages.
Combined Chinese Office Action and Search Report dated Nov. 16, 2020 in Patent Application No. 201780064201.X (with English machine translation), 24 pages.
Combined Chinese Office Action and Search Report dated Jun. 2, 2021 in Chinese Patent Application No. 201780064201.X (with English translation), 27 pages.
Wang Jinlan, et al., "Slurry" Textile Industry Press, Dec. 31, 1979, p. 158 and coverpages (with English translation).

* cited by examiner

*Primary Examiner* — Michael M. Robinson
(74) *Attorney, Agent, or Firm* — Oblon, McClelland, Maier & Neustadt, L.L.P.

(57) ABSTRACT

A process of manufacturing a three-dimensional object includes a step of depositing and solidifying molten polyvinyl alcohol to form a support structure; and a step of depositing and solidifying a molten thermoplastic polymer on the support structure to form a three-dimensional preform. The support structure has a mixture of at least 50% by weight of polyvinyl alcohol and at most 50% by weight of at least one polymer of polyvinyl butyral, polylactid acid, ethylene-vinylalcohol-vinylacetate terpolymer, vinyl acetate-vinyl pyrrolidone copolymer, acrylonitrile-butadiene-styrene terpolymer, polycaprolactone, vinyl acetate-vinyl caprolactame copolymer, and polyvinyl alcohol having a degree of hydrolysis DH of 30-65%. The support structure can be dissolved to form the three-dimensional object.

10 Claims, No Drawings

USE OF MIXTURES OF POLYVINYL ALCOHOL WITH LESS POLAR POLYMERS AS SUPPORT STRUCTURE IN 3D PRINTING PROCESS

The invention is directed to the use of mixtures of polyvinyl alcohol and polymers having a lower polarity as PVOH as support structure in 3D printing process.

BACKGROUND 3D printing processes of thermoplastics are gaining more and more importance in production of plastic parts. Due to the process of subsequently depositing drops of melt of thermoplastic polymer, certain structures like hollow sections can not be built directly from the thermoplastic polymer. In such cases, first a support structure is printed on or around the final structure from the thermoplastic polymer is build. The support structure is prepared from a thermoplastic polymer which can be removed by thermal treatment or solvents which do not affect the thermoplastic polymer providing the desired structure.

Thermoplastic polymers which can be used as support structure are for example waxes, polyethylene glycole, High Impact Polystyrene (HIP), polylactid acid, poly(2-ethyl-2-oxazolidone) or hydroxypropyl methylcellulose as disclosed in WO2015/108768A1.

Furthermore, it is known to utilize polyvinyl alcohol (PVOH) as support material in 3D printing processes, since PVOH is a thermoplastic material with a broad melting range which can be easily removed from the final printed structure by dissolving in water or aqueous alkaline solution. In this respect, the use of amorphous PVOH, optionally mixed with styrene-ethylene-butadien block copolymer SEBS as support material in a 3D printing processes is described in U.S. Pat. No. 8,404,171. SEBS is a non-polar polymer which imparts the dissolving process of the support structure.

In order to precisely build the desired structure of thermoplastic material on the support structure, adhesion between the thermoplastic material and the support structure should be as good as possible.

It was found that a mixture of PVOH with a certain polymers which have a lower polarity than PVOH results in an improved adhesion to printed thermoplastic material without affecting the subsequent removal of the support structure by a solvation process.

The polar polymer added to the PVOH should be polar enough to improve the adhesion of the mixture to the support structure, but not too polar to avoid undesired moisture uptake and to decrease the water solubility of the support structure.

Further, addition of such polymers to PVOH can increase the melt flow rate of the resulting compound and improve processability, which is beneficial for printing at faster rate. In the 3d printing process the polymer filament is pushed through a heated nozzle with a small diameter of commonly around 0.4 mm. For faster printing the filament has to be pushed through the heated nozzle at a higher rate, which requires a lot of force when the melt flow rate of the polymer is low. Typically, large concentrations of plasticizers are required to achieve a good processability and high melt flow rate of PVOH. This, however, results in increased moisture sensitivity and softening of the PVOH compound. This is a big problem for PVOH based 3d printing filaments, which complicates their use. If the filament is too soft, feeding of the filament from the drive gears to the print head can be difficult with some printer models due to wrinkling of the filament in the filament guiding tube.

High moisture absorption limits the shelf life of the filament, because in most printers the filament will be exposed to air. When the moisture level in the filament becomes too high, evaporation of water in the print head results in bubble and foam formation, which leads to uncontrolled release of melt from the nozzle and poor print quality.

Object of the invention was therefore to provide a compound comprising PVOH and a plasticizer having a low moisture uptake, high melting and glass transition temperature resulting in good printing properties.

Accordingly, the invention is directed to a process of manufacturing a three-dimensional object by
- depositing and solidifying molten polyvinyl alcohol (PVOH) to form a support structure
- depositing and solidifying a molten thermoplastic polymer on the support structure to form a three-dimensional preform
- characterized in that the support structure consists of a mixture of at least 50% by weight of polyvinyl alcohol (PVOH) and at most 50% by weight of at least one polymer selected from the group consisting of polyvinyl butyral, polylactic acid, ethylene-vinylalcohol-vinylacetate terpolymer, vinyl acetate-vinyl pyrrolidone copolymer, acrylonitrile-butadiene-styrene terpolymer, polycaprolactone, vinyl acetate-vinyl caprolactam copolymer and polyvinyl alcohol (PVOH) having a degree of hydrolysis DH of 30-65%.

After the printing process, the support structure i.e. the mixture comprising polyvinyl alcohol (PVOH) may be dissolved, preferably in water or alcohol and only the three-dimensional object remains. Water used for dissolving the support structure may be pure water or an aqueous solution of alkaline salts. Recycling of the process solvent i.e. use of solvent already containing dissolved PVOH is also possible.

Such printing processes are called "dual material printing" and are in general known to the person skilled in the art.

Preferably referable, the polyvinyl alcohol (PVOH) composition used in the process of the invention has one or more of the following properties:
- an vinyl acetate content of at least 10 mol %, at least 15 mol % or at least 20 mol %, with an upper limit of 50 mol % to allow water solubility
- a degree of polymerization of 200-3000 or 250-2000 or 300-1500
- a degree of hydrolysis DH of 60-99% or 70-95% or 72-90%
- a viscosity of a 4% aqueous solution of 2-20 mPa s or 3-10 mPa s.

Optionally the polyvinyl alcohol (PVOH) composition may comprise up to 20% by weight (based on the total weight of the composition) of one or more plasticizers. Any compound known to plasticize PVOH such as water, glycerine, diglycerine, sorbitol, ethylene glycol, diethylene glycol, polyethylene glycol, pentaerythritol, dipentaerythritol, propylene glycol, trimethylolpropane, di-trimethylolpropane, triethanolamine may be used for the purpose of the invention.

The polyvinyl alcohol (PVOH) composition may comprise one or more PVOH grades, differing in vinyl acetate content and/or degree of polymerization and/or degree of hydrolysis and/or viscosity.

Further, the polyvinyl alcohol (PVOH) may contain as repeating units vinyl alcohol, vinyl acetate and up to 20 Mol % of olefinic monomers. Suitable repeating units are for example, but not limited to: ethylene, 1-olefins (e.g. propylene, 1-butene, isobutylene), 1-butene-3,4-diacetate, 1-butene-3,4-diol, vinyl ethers (e.g. methyl vinyl ether, ethyl vinyl ether, n-propyl vinyl ether, isopropyl vinyl ether), N-vinyl amides (e.g. N-vinylpyrrolidone, N-vinylcaprolactam), isopropenyl acetate, isopropanol, allyl acetate, allyl alcohol. The exact composition can be adjusted as necessary for the printing process.

The polyvinyl alcohol (PVOH) used as additive may preferentially have a degree of hydrolysis DH of 40-55%

EXAMPLES

Measurement of Degree of Hydrolysis:

Degree of hydrolysis: indicates percentage of vinyl acetate unit saponified to vinyl alcohol unit and it is calculated by following equation. EV standards for Ester Value which is the number of mg KOH needed to neutralize the acid released from the ester by saponification in 1 g of substance and it is measured according to EN ISO 3681.

Degree of hydrolysis: $=100\times(100-0.1535\times EV)/(100-0.0749\times EV)$

Measurement of Vinyl Acetate Content

The vinyl acetate content is calculated from the degree of hydrolysis hydrolysation (DH) by following equation.

Vinyl acetate content$=100-DH$

Measurement of Degree of Polymerization

The degree of polymerization is measured according to JIS K6727. Specifically, it may be calculated by the equation below from the limiting viscosity [η] (unit: L/g) measured in water at 30° C. after resaponification and purification of the PVOH.

Degree of polymerization$=([\eta]\times10000/8.29)^{(1/0.62)}$

Viscosity:

For the measurements 4 wt % solutions in distilled water were prepared. The measurements were performed in a falling ball viscometer according to DIN 53 015.

Measurement of Moisture Uptake

The moisture uptake of each sample was determined by placing a defined quantity of pellets of each compound into a climate chamber at 23° C. and a relative humidity of 50%. The weight increase was measured over time. For comparison the moisture uptake after 14 days is used.

Measurement of Melt Flow Rate

The melt flow rate of the PVOH compounds was measured with a Gottfert MP-D machine by heating 6 g of material at 190° C. for 5 minutes before putting a load of 21.6 kg on the piston. The measurement was started after an additional pre-running time of 1 minute.

Preparation of PVOH Compositions for 3D Printing

PVOH compositions were prepared by compounding in a twin screw extruder as described in WO 03/020823 A1. Optionally filaments with a diameter of 1.75 mm or 2.85 mm, respectively, for 3D printing tests by fused filament fabrication (FFF) technology were extruded with a Dr. Collin 30 mm single screw extruder by a process commonly known to those skilled in the art. Alternatively, compounding and filament extrusion was carried out with a DSM Xplore micro compounder MC 15.

Dual Material 3D Printing Adhesion Test

To determine the adhesion strength of the PVOH compositions on polylactic acid (PLA) as a main printing material, a circular 3-layer sandwich structure was 3d printed on a Felix Pro 1 printer with filaments extruded from the PVOH compounds. The printing temperature for PLA was 190° C. and the printing temperature for the PVOH compounds was 205° C. The printing speed for both materials was set to 25 mm/s and the printing layer thickness to 150 μm. From the bottom the specimen consists of 3×150 μm of PLA followed by 2×150 μm of PVOH compound followed by 4×150 μm of PLA. The area of each adhesion interface is 2.35 cm$^3$. The adhesion strength was determined by measuring the force required to delaminate the 3d printed specimen in a tensile testing machine. An average value was calculated from at least five measurements. The result reflects the adhesion strength of the weakest interface.

Comparative Example 1

PVOH with a 4% solution viscosity of 5.0 mPa·s and a degree of hydrolysis: of 74% was prepared. The melt flow rate (190° C., 21.6 kg) is 15.7 g/10 min and the moisture absorption at 23° C. and 50% relative humidity after 14 days is 2.1%. In the 3d printing adhesion test a force of less than 20 N is required to delaminate the 3d printed specimen. The low melt flow rate makes printing at high rate difficult and the low adhesion strength results in frequent issues during 3d printing due to detachment of the printed object from the support structures.

Comparative Example 2

To the PVOH described in comparative example 1, 5 wt. % of trimethylolpropane was added to increase the plasticizer content. The melt flow rate (190° C., 21.6 kg) is 46.7 g/10 min and the moisture absorption at 23° C. and 50% relative humidity after 14 days is 3.8%. The increased melt flow rate allows printing at higher rate than comparative example 1. However, the significantly increased moisture absorption decreases shelf life of the filament when exposed to air.

Comparative Example 3

PVOH with a 4% solution viscosity of 5.5 mPa·s and a degree of hydrolysis of 88% was prepared. The melt flow rate (1.90° C., 21.6 kg) is 2.3 g/10 min and the moisture absorption at 23° C. and 50% relative humidity after 14 days is 2.1%. In the 3d printing adhesion test a force of less than 20 N is required to delaminate the 3d printed specimen. The low melt flow rate makes printing at high rate difficult and the low adhesion strength results in frequent issues during 3d printing due to detachment of the printed object from the support structures.

Comparative Example 4

To the PVOH described in comparative example 3, 3 wt. % of trimethylolpropane was added to increase the plasticizer content. The melt flow rate (190° C., 21.6 kg) is 9.7 g/10 min and the moisture absorption at 23° C. and 50% relative humidity after 14 days is 2.7%. The increased melt flow rate allows printing at somewhat higher rate than comparative example 3. However, the increased moisture absorption decreases shelf life of the filament when exposed to air.

Comparative Example 5

PVOH with a 4% solution viscosity of 4.8 mPa·s and a degree of hydrolysis of 88% was prepared. The melt flow rate (190° C., 21.6 kg) is 13.1 g/10 min and the moisture absorption at 23° C. and 50% relative humidity after 14 days is 2.0%. In the 3d printing adhesion test a force of less than 20 N is required to delaminate the 3d printed specimen. The low melt flow rate makes printing at high rate difficult and the low adhesion strength results in frequent issues during 3d printing due to detachment of the printed object from the support structures.

Example 1

To the PVOH described in comparative example 1, 10 wt. % of vinyl acetate-vinyl pyrrolidone copolymer (BASF Sokalan VA64 P) was added. The melt flow rate (190° C., 21.6 kg) is 42.6 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 2

To the PVOH described in comparative example 1, 20 wt. % of vinyl acetate-vinyl pyrrolidone copolymer (BASF Sokalan VA64 P) was added. The melt flow rate (190° C., 21.6 kg) is 66.7 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 3

To the PVOH described in comparative example 1, 30 wt. % of vinyl acetate-vinyl pyrrolidone copolymer (BASF Sokalan VA64 P) was added. The melt flow rate (190° C., 21.6 kg) is 153.8 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 4

To the PVOH described in comparative example 1, 20 wt. % of a PVOH grade with a degree of hydrolysis of 50% and a 10% solution (methanol/water 1:1) viscosity of 9.5 mPa·s was added. The melt flow rate (190° C., 21.6 kg) is 89.1 g/10 min and the moisture absorption at 23° C. and 50% relative humidity after 14 days is 2.9%. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. An even higher melt flow rate could be achieved than in comparative example 2 and with lower moisture absorption, which is beneficial for a longer shelf life of the filament. Support structures printed with this compound are soluble in water at 25° C.

Example 5

To the PVOH described in comparative example 1, 5 wt. % of polycaprolactone (Sigma-Aldrich) was added. The melt flow rate (190° C., 21.6 kg) is 49.0 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 6

To the PVOH described in comparative example 1, 10 wt. % of polycaprolactone (Sigma-Aldrich) was added. The melt flow rate (190° C., 21.6 kg) is 65.3 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 7

To the PVOH described in comparative example 1, 5 wt. % of ABS (Terluran GP-35, INEOS Styrolution) was added. The melt flow rate (190° C., 21.6 kg) is 25.5 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 8

To the PVOH described in comparative example 1, 5 wt. % of PLA (NatureWorks Ingeo 6202D) was added. The melt flow rate (190° C., 21.6 kg) is 26.7 g/10 min. In the 3d printing adhesion test a force of more than 20 N is required to delaminate the 3d printed specimen. The increased melt flow rate allows printing at higher rate than comparative example 1 and the higher adhesion strength allows for reliable printing without detachment of the support structures from the main object. Support structures printed with this compound are soluble in water at 25° C.

Example 9

To the PVOH described in comparative example 3, 5 wt. % of PLA (NatureWorks Ingeo 6202D) was added. The melt flow rate (190° C., 21.6 kg) is 4.3 g/10 min. In the 3d printing adhesion test a force of more than 20 N is required to delaminate the 3d printed specimen. The increased melt flow rate allows printing at somewhat higher rate than comparative example 3 and the higher adhesion strength allows for reliable printing without detachment of the support structures from the main object. Support structures printed with this compound are soluble in water at 25° C.

Example 10

To the PVOH described in comparative example 3, 10 wt. % of a PVOH grade with a degree of hydrolysis of 50% and a 10% solution (methanol/water 1:1) viscosity of 9.5 mPa·s was added. The melt flow rate (190° C., 21.6 kg) is 14.0 g/10 min and the moisture absorption at 23° C. and 50% relative humidity after 14 days is 2.2%. In the 3d printing adhesion test a force of more than 20 N is required to delaminate the 3d printed specimen. The increased melt flow rate allows printing higher rate than comparative example 3 and the higher adhesion strength allows for reliable printing without detachment of the support structures from the main object. An even higher melt flow rate could be achieved than in comparative example 4 and with lower moisture absorption, which is beneficial for a longer shelf life of the filament. Support structures printed with this compound are soluble in water at 25° C.

Example 11

To the PVOH described in comparative example 5, 5 wt. % of a PVOH grade with a degree of hydrolysis of 50% and a 10% solution (methanol/water 1:1) viscosity of 9.5 mPa·s was added. The melt flow rate (190° C., 21.6 kg) is 18.1 g/10 min. In the 3d printing adhesion test a force of more than 20 N is required to delaminate the 3d printed specimen. The increased melt flow rate allows printing higher rate than comparative example 5 and the higher adhesion strength allows for reliable printing without detachment of the support structures from the main object. Support structures printed with this compound are soluble in water at 25° C.

Example 12

To the PVOH described in comparative example 5, 10 wt. % of a PVOH grade with a degree of hydrolysis of 50% and a 10% solution (methanol/water 1:1) viscosity of 9.5 mPa·s was added. The melt flow rate (190° C., 21.6 kg) is 26.3 g/10 min. In the 3d printing adhesion test a force of more than 20 N is required to delaminate the 3d printed specimen. The increased melt flow rate allows printing higher rate than comparative example 5 and the higher adhesion strength allows for reliable printing without detachment of the support structures from the main object. Support structures printed with this compound are soluble in water at 25° C.

The invention claimed is:

1. A process of manufacturing a three-dimensional object, the process comprising:
    depositing and solidifying a molten polyvinyl alcohol composition to form a support structure; and
    depositing and solidifying a molten thermoplastic polymer on the support structure to form a three-dimensional preform,
    wherein
    the molten polyvinyl alcohol composition is a mixture of at least 50% by weight of a first polyvinyl alcohol having a degree of hydrolysis of 60-99% and at least one polymer selected from the group consisting of polyvinyl butyral, polylactic acid, ethylene-vinylalcohol-vinylacetate terpolymer, vinyl acetate-vinyl pyrrolidone copolymer, acrylonitrile-butadiene-styrene terpolymer, polycaprolactone, vinyl acetate-vinyl caprolactame copolymer, and a second polyvinyl alcohol having a degree of hydrolysis of 30-65%.

2. The process according to claim 1, wherein the polyvinyl alcohol having a degree of hydrolysis of 60-99% has a vinyl acetate content of at least 10 mol %.

3. The process according to claim 1, wherein the polyvinyl alcohol having a degree of hydrolysis of 60-99% has a degree of polymerization of at least 200-3000.

4. The process according to claim 1, further comprising removing the support structure by dissolving the support structure in water and/or alcohol to obtain the three-dimensional structure.

5. The process according to claim 1, wherein the molten composition comprising a polyvinyl alcohol is deposited at a temperature of at least 170° C.

6. The process according to claim 1, wherein the thermoplastic polymer is deposited on the support structure at a temperature of at least 140° C.

7. The process according to claim 1, wherein the thermoplastic polymer is selected from the group consisting of polylactic acid, acrylonitrile-butadiene-styrene copolymer, a polyamide, a polycarbonate, polyethylene terephthalate, a polyethylene terephthalate copolymer, a polyhydroxyalkanoate, a wood filled composite, a metal filled composite, a carbon fiber filled composite, polyvinylbutyral, a thermoplastic elastomer, a thermoplastic polyurethane, a polyolefin, a polyproplyene, acrylonitrile styrene acrylate, a polyacrylate, a polymethacrylate, polystyrene, polyoxymethylene, and a mixture thereof.

8. The process according to claim 1, wherein the polyvinyl alcohol having a degree of hydrolysis of 60-99% comprises as repeating units vinyl alcohol, vinyl acetate and up to 20 mol % of further olefinic monomers.

9. The process according to claim 1, wherein the composition comprising a polyvinyl alcohol having a degree of hydrolysis of 60-99% further comprises up to 20% by weight based on the total weight of the composition of one or more plasticizers selected from the group consisting of water, glycerine, diglycerine, sorbitol, ethylene glycol, diethylene glycol, polyethylene glycol, pentaerythritol, dipentaerythritol, propylene glycol, trimethylolpropane, di-trimethylolpropane and triethanolamine.

10. The process according to claim 1, wherein the polyvinyl alcohol composition comprises the polyvinyl alcohol different from the polyvinyl alcohol having a degree of hydrolysis of 60-99% and the different polyvinyl alcohol comprises one or more grades of polyvinyl alcohol, differing in vinyl acetate content and/or degree of polymerization and/or degree of hydrolysis and/or viscosity.

* * * * *